Patented June 30, 1931

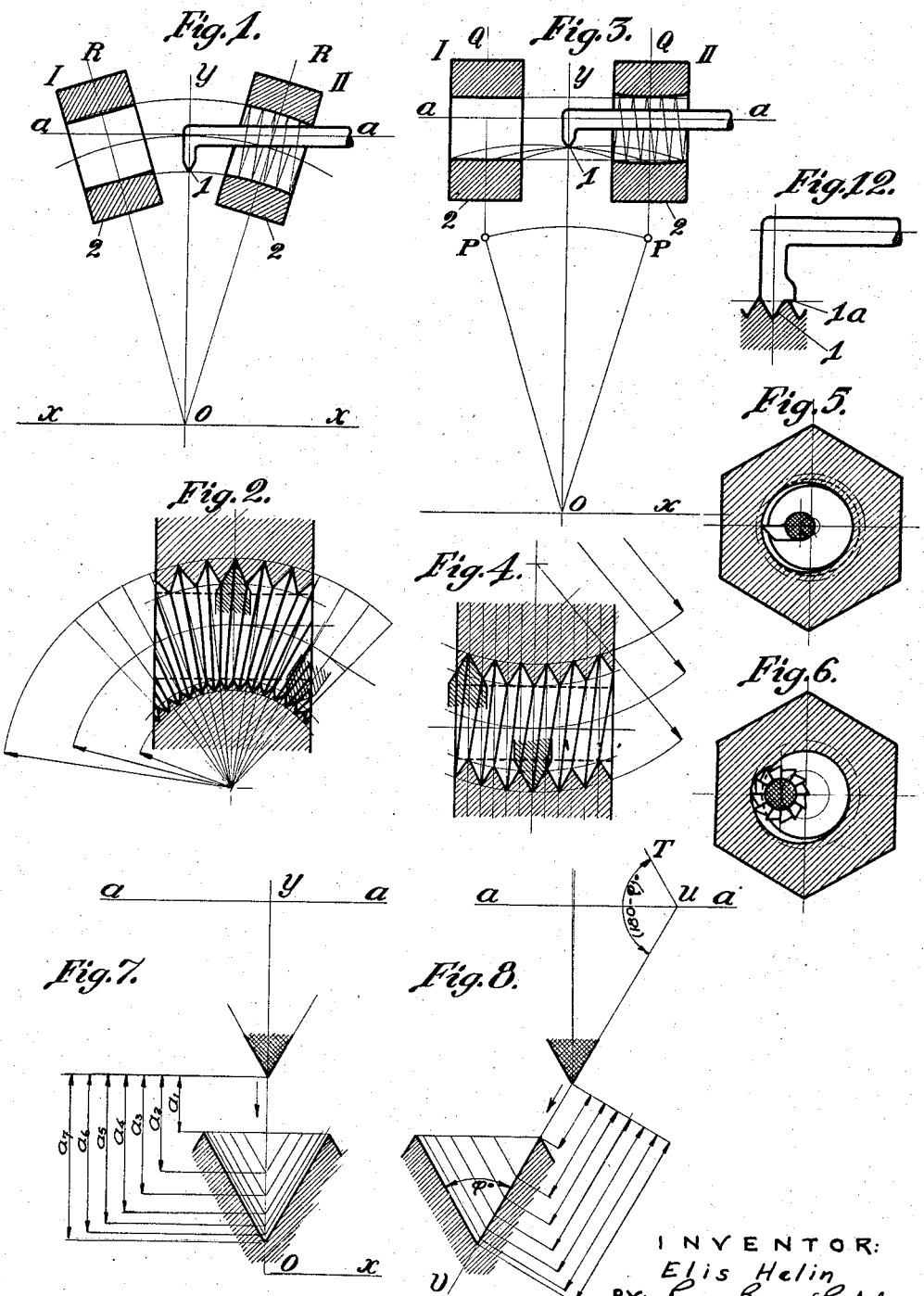

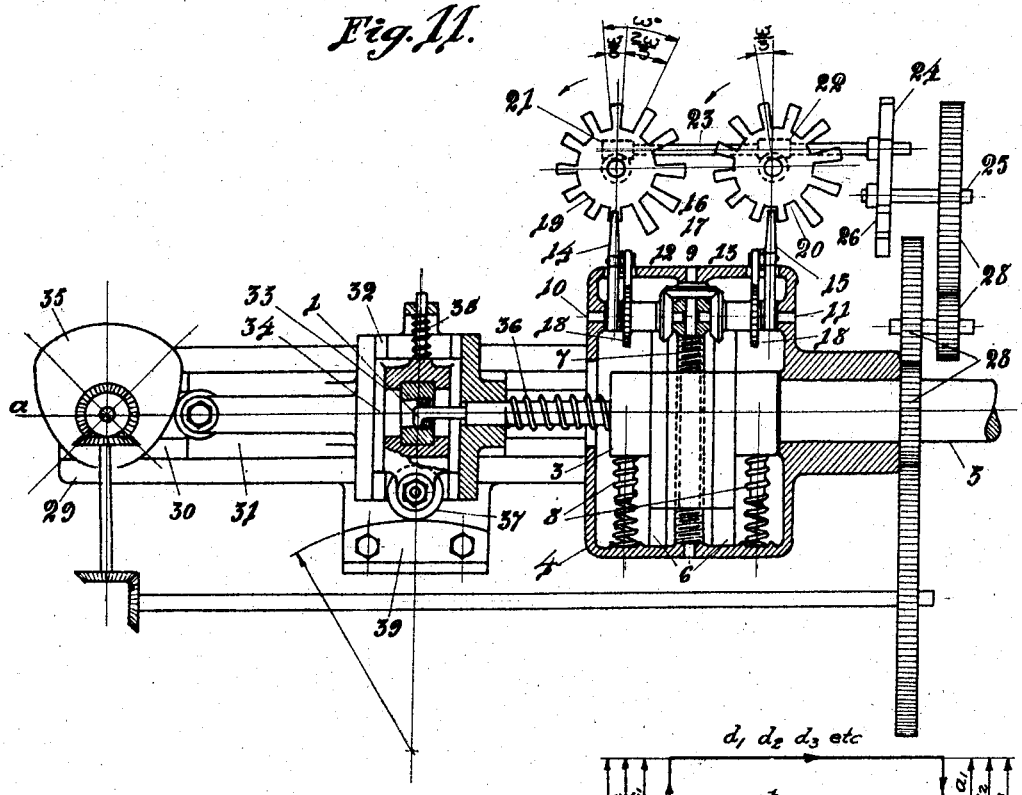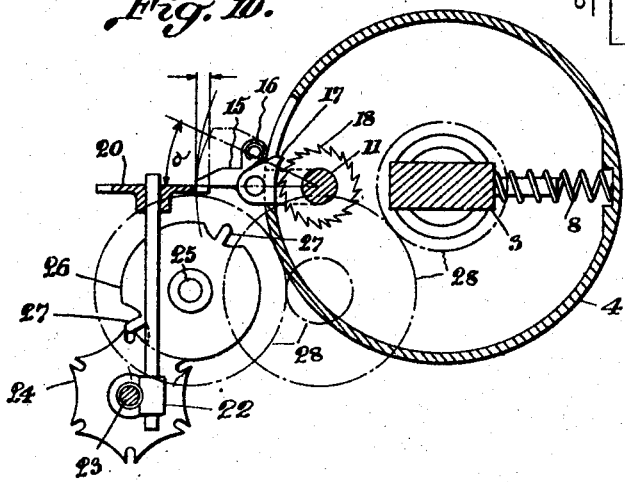

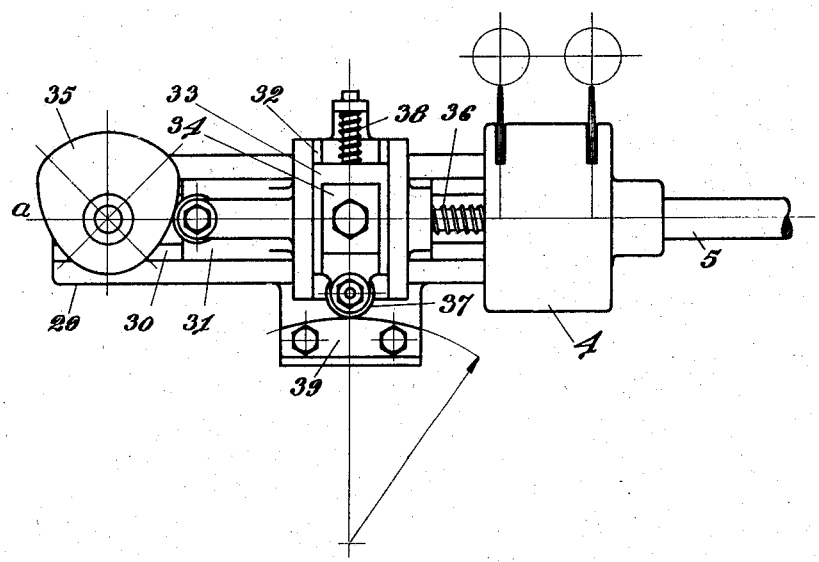

1,812,205

UNITED STATES PATENT OFFICE

ELIS HELIN, OF LILJEHOLMEN, STOCKHOLM, SWEDEN

METHOD FOR MANUFACTURING CURVE THREADED NUTS AND MEANS THEREFOR

Application filed February 24, 1928, Serial No. 256,531, and in Sweden August 9, 1927.

This invention relates to a machine for cutting curve-threaded nuts, mainly characterized by a cutter which at each moment works on a nut-blank at a single spot and moves in relation to the nut-blank along a screw-line, the axis of which is a curve, and means for guiding the cutter and the nut-blank.

The said curve may be a circle, in which case the guiding means are the simplest possible. But either the axis of the said screw-line be a circle or another curve, the relative movement of the nut-blank and the cutter can be two-fold. A screw-line is known to be generated by a double movement, namely a turning movement round the axis of the screw-line and a longitudinal movement in the direction of the said axis, and this latter movement can differ. Of the two special cases here referred to, one is characterized by the turning plane of the generatrix (in this instance the cutter) at every moment of the movement being at right angles to the curved axis of the screw-line, and the other by the said plane moving translatorily. The double movement of the cutter in relation to the nut-blank is in both cases assumed to take place in such a manner, that the cutter performs the turning movement and the nut-blank the longitudinal movement. In practice the second special case is to be preferred.

In the accompanying drawings, Fig. 1 represents the first-named of the two special cases referred to above, and Fig. 2 a section on a larger scale through a nut cut by a cutter moving as shown in Fig. 1. Fig. 3 shows the second special case, and Fig. 4 a section on a larger scale through a nut cut by a cutter moving as shown in Fig. 3. Fig. 5 shows a cutter consisting of a single tooth. Fig. 6 shows a cutter in the form of a milling-wheel. Figs. 7 and 8 are diagrams showing adjustment of the cutter. Fig. 9 indicates the cutting periods. Figs. 10 and 11 show a machine for forming the nut. Fig. 12 shows a form of cutter.

Examples of curved-nut construction

Fig. 1 illustrates a procedure for generating a curved thread. A cutter 1 rotates with constant angular speed round a fixed axis $a$—$a$, situated in the plane, and parallel with axis X—X. The nut-blank 2 moves also with constant angular speed along an arc, having O as centre, to and past the rotary plane $y$O of cutter 1, from position I to position II in Fig. 1. The nut-blank of suitable form, 2, is affixed to a rod on line OR, turnable on a pin at O. During the motion of the nut-blank 2 toward the cutter 1 the latter generates a thread with a certain deformation corresponding to the guiding of the nut-blank as shown in Fig. 1. Fig. 2 shows the character of the deformation ensuing in this case, the bending being shown exaggerated.

Fig. 3 shows a procedure whereby a curved thread of a different character can be obtained. Cutter 1 rotates, as previously, with a constant angle speed round a fixed axis $a$—$a$, parallel with axis X—X, the rotation also in this instance taking place in plane $y$O. A nut-blank 2 of suitable form is fixed to a translatorily movable rod located at PQ, which is guided by another guiding rod located at OP turnable on pins at O and P. Nut-blank 2 moves with a constant linear speed along axis X—X, its movement being translatory and in an arc with O as centre towards and past the rotary plane $y$O of cutter 1, from position I to position II in Fig. 3. During the movement of the nut-blank 2 toward the cutter 1 the latter generates a thread with a certain deformation corresponding to the guiding of the nut-blank 2, as shown in Fig. 3. Fig. 4 shows, with exaggerated bending the character of the deformation thus created. For obvious reasons the bending of the generated thread will in this case be convex in relation to the pin at O. If a thread has been generated as by the method shown in Fig. 1, its bend will naturally be concave in relation to the same pin.

By using different guiding methods and speeds, curved threads of an infinite number of variations can be made, and each variation will in all instances correspond to a certain deformation of the thread. It is of course not essential that the movements should be uniform, as assumed above. By changing the speed of the nut-blank further variations will be effected. The centre line of the thread can furthermore be bent in another curve than an arc.

A curved thread cannot be cut to the full depth in one screw-line movement by using a cutter. The nut-blank, on the other hand, must be operated by the cutter several times, as a cutter cannot, as a rule, make so deep a cut as a full profile of the thread. Thread-cutting with a cutter is shown in Fig. 5, while cutting with a milling-wheel is shown in Fig. 6. As for Fig. 6, it may be observed, that the axis of the milling-wheel is not parallel with the axis of the nut-blank, but owing to the pitch of the thread it is inclined to the said axis.

The shape of the nut-blank 2, to be treated as indicated above, is the usual one with outlines as per usual types and with an unthreaded hole through the centre, the said hole, (as it will be seen from Figs. 2 and 4) ought to be of a somewhat smaller diameter than the core-diameter of the respective thread-dimensions.

The shape of cutter 1, which does the work, should suit the thread profile. The cutter may, however, whenever necessary have a chamfering edge $1a$ (see Fig. 12) to cut the threads-tops to the required heights.

As mentioned previously, a cutter must cut the nut-blank several times before the profile of the thread is completed. This results in the necessity after each time to readjust the cutter. This can be done either as indicated in Fig. 7, by causing the re-adjusting movement of the cutter to take place in the plane $yO$ or as shown in Fig. 8 by causing these movements to follow the surface of a cone TUV, the vertical angles of which are equal to $(180-n)°$ when $n$ is the edge angle of the thread. In both instances it is essential that these movements of the cutter be gradually decreased from a certain initial magnitude as the thread is nearing its completion in the manner shown in Figs. 7 and 8. In these figures for clearness sake only a few cuts have been shown as necessary.

It will be understood from the above, that to cut a thread to its full profile, the movement of the cutter relative to the nut-blank, i. e. the setting, the working and the retiring movements occur in conformity with a certain series of periods. Such a series has 4 single periods combined in a manner as shown in Fig. 9. In the diagrams of Fig. 9 it has been supposed that the cutter is set-on in plane $yO$. For each cut the cutter must:—

(a) Be advanced radially (positive movement).

(b) During the cutting operation advance axially (positive movement). This is made possible by the movement of the nut-blank. Compare Figs. 1 and 2.

(c) Be returned radially (negative movement).

(d) Return axially when idle (negative movement). This is also done by moving the nut-blank.

It is obvious that a machine, working under this scheme, cannot have a large output, should it not be an automatic one, i. e. the said periods should follow each other automatically, and the series of periods $a—d$ also to be automatically repeated as many times as required for completion of the thread.

An automatic thread-cutting machine for the manufacture of the nuts in question can be divided into two parts, one of which refers to the manœuvring of the cutter, and the other one to the manœuvring of the nut-blank.

The machine, which will now be described, is for the nut-blank illustrated in Fig. 3.

From what has been mentioned above it is evident that the movement of the cutter relatively to the nut-blank is composed of a rotary and a translatory movement. As indicated in Fig. 3, the components of these movements are realized in the thread-cutting machine (automatic) so that the cutter has a rotary movement only and the nut-blank a translatory movement only. As the nut-blank must be cut several times by the same cutter or tool before a thread of required depth is produced, the machine is provided with return movements, contrary to the working movements, which may be referred to as positive. In this instance, the advance translatory movement of the nut-blank can be followed, with advantage by a negative back-movement, the rotary movement of the cutter should however, not be altered. From a constructional point of view it is decidedly of advantage to cause the rotary movement uninterruptedly to continue even during the movement of the blank. To enable this to be done, both the return and positive movements of the cutter take place in a radial direction, of which otherwise only the latter would have been needed.

When the above method is followed, the movement of the cutter is characterized by a positive advance movement of the magnitude $a1$ (see Fig. 7); then a period of rest; then a back-movement of the same magnitude as the advance movement; and then a period of rest. This is followed by the positive $a2$; rest; a return movement as large as $a2$; a rest. After this follows a positive movement $a3$; a rest; a return movement as large as $a3$; a rest, etc.

For the proportions between $a1$, $a2$, $a3$, etc. applies that:—$a1<a2<a3<$etc.

Finally, from what has been explained previously:—$a2—a1>a3—a2>a4—a3>$etc.

Seen from a purely mechanical point of view a maneuvering device for the cutter may be arranged in the following manner (see Figs. 10 and 11), at right angles to the rotary axis $a—a$, as shown in Fig. 7. A modification with an advance as shown in Fig. 8 is not quite so simple, though it does not offer any constructional difficulties. The cutter 1 is fitted in holder 3, which can be moved diametrically in a chuck mounted on the driving shaft 5 ($a$—$a$). The holder 3 is movable on guide 6 and its diametral movements are caused by screw 7. Idle movement between holder 3 and screw 7 is eliminated by springs 8. The screw 7 is provided with a gear wheel 9 meshing with two gears, 12 and 13 respectively on axes 10 and 11. On these latter axes striking arms 14 and 15 are fixed, which project outside chuck 4 through apertures in its cylindrical wall. By means of springs (not shown on the drawings) the striking arms 14 and 15 are kept in their normal position of rest and pressed against the fore-edge of the apertures in chuck 4. The striking arms 14 and 15 carry pawls 17 actuated by springs 16, these pawls being held in a position of release when the striking arms 14 and 15 are in a position of rest by pressure against the edges of the apertures in the chuck 4. When either of these arms is turned the pawls 17 engaged with ratchet wheels 18 fixed to axes 10 and 11, so that the corresponding axes 10 and 11 partake in the turning movement, which is then by the gear wheel 9 transferred to screw 7. It will be seen, that to turn the striking arms 14 and 15 in the same direction, the screw 7 will turn in different directions, resulting in cutter 1 moving diametrically in different directions in chuck 4. The cutter 1 can consequently be manœuvred by alternatively acting and suitably arranged obstruction placed in the way of the striking arms 14 and 15, when chuck 4 is rotating.

Should such an obstruction as 20 (see Fig. 10) be placed in the way of the striking arm 15, the result will be that when chuck 4 rotates the striking arm will swing from this hindrance for a certain angle $w$, whose magnitude will depend upon the rise (H) with which the hindrance 20 enters into the field of rotation of striking arm 15. By varying this rise H and consequently the angle of $w$ the degree of the radial removal of cutter 1 per turn of the rotation of chuck 4 may also be varied.

As mentioned above, one of the striking arms 14 and 15 regulates the advance and the other one the return movement of the cutter. From Fig. 11 it will be seen that the striking arm 14 is supposed to bring about the advance, and the striking arm 15 the return movement of the cutter. The alternatively acting obstruction striking arms 14 and 15 have been formed as a kind of toothed discs 19 and 20 which, by two worm gears, 21 and 22 respectively are connected with a common driving shaft 23. The toothed discs 19 and 20 are constructed in such manner that the width of the teeth is only half the width of the interstices. If the division is $w°$, a tooth comprises a central angle of $w°/3$, and the interstice a central angle $2w°/3$. Initially these toothed discs 19 and 20 are set alternating, so that the back-disc 20 has an advance angle of $w°/3$ in the direction of the rotation. The turning movement of toothed discs 19 and 20 is intermittent. The discs consequently move intermittently, but simultaneously, and the angle movement is each time of the magnitude $w°/3$. Thus the striking arms 14 and 15 are actuated in the following manner. In the position occupied by toothed discs 19 and 20 in Fig. 9, the striking arm 14, for the movement of advance is about to strike against a tooth in disc 19, while striking arm 15 for the return movement is passing through an interstice in disc 20. This state is maintained during $m$ revolutions of chuck 4, during which the total setting-on will reach $a$ (see Fig. 9).

After $m$ revolutions of chuck 4, both the discs 19 and 20 advance one step or an angle of $w°/3$. In this their second combination of positions the striking arm 14 has entered an interstice of disc 19. The striking arm 15 is still in the same interstice of disc 20. At this stage it must be borne in mind that the width of the interstices is double the width of the teeth. Both the striking arms 14 and 15 remain consequently at rest in relation to the rotating chuck and its period of rest lasts for $n$ revolutions.

During this period the cutter 1 performs its working period $b$ (see Fig. 9), which is made possible by the nut-blank being moved to and past its field of rotation.

After $n$ revolutions of chuck 4, the toothed discs 19 and 20 advance another step of the same magnitude, viz. $w°/3$. In the third combinations of positions thus arrived at, striking arm 14, in analogy with what has been said with reference to striking arm 15, remains in an interstice of disc 19. The striking arm representing the back movement, 15, on the contrary has come in contact with a tooth on disc 20. This state continues during $m$ revolutions of chuck 4, during which period the total return movement will reach the magnitude $c$ (see Fig. 9). It has previously been pointed out that the forward and back-movements are equal during one single period.

After $m$ revolutions of chuck 4 the two discs 19 and 20 advance further one step to the same extent as before, viz. $w°/3$, and in so doing occupy a fourth combination of position, when obviously striking arms 14 and 15 have entered the interstices of the respective toothed discs 19 and 20, and thus are in rest as regards rotating chuck 4. This condition continues during $n$ revolutions, when cutter 1 performs its return period $d$ (see Fig. 9) on the nut-blank being returned, the procedure of which is explained below.

Now one series of periods, for instance $a1$—$d1$, is completed. The new $a2$—$d2$, which immediately follows is similar in every respect to the previous one, apart from the fact that $a2$ should be of greater value than $a1$, and consequently also $c2$ of greater value than $c1$. As mentioned previously $a$ and $c$ should increase at each series of periods until the thread is finished. This is attained by the said discs 19 and 20 being of spiral shape so that a subsequent tooth (in the direction of rotation of the discs) has a larger radial extension than the previous one. The radial extension of the teeth should consequently be calculated first, with regard to the general rules for the magnitude of $a1$, $a2$, $a3$, etc. as mentioned above with reference to the operation of the cutter (compare Figs. 7 and 8), and then with regard to practical circumstances (such as conditions to be taken into consideration with regard to the cutter etc.). Finally it may be pointed out, that the number of teeth should be equal to the necessary number of series of periods for cutting certain thread dimension.

Different constructions of the toothed discs should consequently be used for different thread dimensions. For the intermittent feeding of discs 19 and 20 the following gearing means may be used. On the common driving shaft 23 of discs 19 and 20 a toothed wheel 24. On an independent shaft 25 a toothed wheel 26 is mounted. This latter wheel is provided with two teeth 27, which are placed apart in such manner that the angle distance is in the relation of $m:n$. The above mentioned shaft 25 is set in motion by the driving shaft 5 by means of gearing, 28 or the like, in such proportion that when shaft 25 has completed one revolution, the shaft 5 has turned $m$ plus $n$ revolutions. In consequence of the arrangement described above the toothed discs 19 and 20 will advance one step ($w°/3$), alternatively after every $m$ and every $n$ revolution of driving shaft 5.

To operate the nut-blank the following arrangements are provided.

The stand 29 of the machine is constructed with a guide 30 parallel with the rotary axis ($a$—$a$) of the cutter. Along with this guide 30 there is a movable support 31. Support 31 is constructed with a guide 32, running at right angles to the said $a$—$a$. Along with guide 32 is a second movable support 33, carrying a chuck 34 for nut-blank 2.

The longitudinal support 31 has an oscillating movement, the oscillations being suitably interrupted with periods of rest, which are so arranged that they agree with the advance and return periods $a$ and $c$ respectively (see Fig. 9) of cutter 1. This oscillating movement is suitably imparted to support 31 from a cam disc 35, which derives its rotation through suitable transmission arrangements from shaft 5, see Fig. 11, the ratio of transmission being such that the cam disc 35 makes one revolution during each complete operation of the nut-blank 2 and the cutter 1. Support 31 cooperates with a return-spring 36 in such manner, that the movement during the working period $b$ of the cutter (see Fig. 9) is directly caused by a cam disc 35, whereas the movement during the period of return $d$, is caused by the said spring 36. The periods of rest of support 31 correspond on the cam disc 35 with circle-sectors.

The transverse support 33 receives its motion from the longitudinal support 31 by a guiding arrangement consisting of a roller or the like 37 fitted to support 33, which roller by a spring 38 acting on support 33 is held pressed against a curve-segment 39 in the stand 29, which segment will then act as a guide for the component of the translatory movement at right angles to the axis of rotation ($a$—$a$). The other component of the translatory movement parallel with the said axis ($a$—$a$) is identical with the movement of the longitudinal support 31. The curve segment 39 may be of any form, but is on the drawing shown as circular, the described arrangement thus acting similarly to the arrangement, which is shown schematically in Fig. 3.

Having now described my invention, what I claim as new and desire to secure by Letters Patent is :—

1. A method of cutting a curved threaded nut from an apertured nut-blank by means of a cutting member in engagement with the bore of said nut-blank, consisting in rotating said cutting member and simultaneously imparting to one of said members a translatory movement corresponding to the desired curve of the thread.

2. A method of cutting a curved threaded nut from an apertured nut-blank by means of a cutting member in engagement with the bore of said nut-blank, consisting in rotating said cutting member and simultaneously imparting to said nut-blank a translatory movement corresponding to the desired curve of the thread.

3. A method of cutting a curved threaded nut from an apertured nut-blank by means of a cutting member in engagement with the bore of said nut-blank, consisting in imparting to one of said members a movement parallel to itself along a curve corresponding to the desired curve of the thread and simultaneously rotating one of said members.

4. A method of cutting a curved threaded nut from an apertured nut-blank by means of a cutter in engagement with the bore of said nut-blank, consisting in rotating said cutter, simultaneously imparting to said nut-blank a movement parallel to itself along a curve corresponding to the desired curve of the thread and repeating said operations, until the desired depth of the profile of the thread is obtained.

5. A method of cutting a curved threaded nut from an apertured nut-blank by means of a cutter in engagement with the bore of said nut-blank, consisting in rotating said cutter, simultaneously imparting to said nut-blank a translatory movement along a curve corresponding to the desired curve of the thread and repeating said operations, until the desired depth of the profile of the thread is obtained, while maintaining the cutter in rotation.

6. A method of cutting a curved threaded nut from an apertured nut-blank by means of a cutter in engagement with the bore of said nut-blank, consisting in rotating said cutter and simultaneously imparting to said nut-blank a movement parallel to itself along a curve corresponding to the desired curve of the thread, adjusting the cutter radially outwardly in relation to the nut-blank and repeating the operations, re-adjusting the cutter radially inwardly in relation to the nut-blank and repeating the adjustment and rotation of the cutter as well as the movement of the nut-blank, until the desired depth of the thread is obtained.

7. A method of cutting a curved threaded nut from an apertured nut-blank by means of a cutter in engagement with the bore of said nut-blank, consisting in rotating the cutter, moving the nut-blank parallel to itself along a curve corresponding to the desired curve of the thread, adjusting the cutter outwardly in relation to the nut-blank and repeating the operations, re-adjusting the cutter inwardly in relation to the nut-blank, repeating the adjustment and rotation of the cutter as well as the movement of the nut-blank, until the desired depth of the profile of the thread is obtained, while controlling the adjusting and re-adjusting movement of the cutter in such manner that the difference between two consecutive adjustments becomes smaller from stage to stage.

8. A machine for cutting curved threaded nuts from apertured nut-blanks comprising a cutting member, means to rotate said cutting member, a support for said nut-blank and means for imparting to the nut-blank a translatory movement along a curve corresponding to the desired curve of the thread.

9. A machine for cutting curved threaded nuts from apertured nut-blanks comprising a cutter, means to rotate said cutter, a support for the nut-blank, means to advance said support translatorily along a curve corresponding to the desired curve of the thread to cause the cutter to operate on the bore of the nut-blank and means to adjust the cutter radially in relation to the bore of the nut-blank.

10. A machine for cutting curved threaded nuts from apertured nut-blanks, comprising a cutter, means to rotate said cutter, a support for the nut-blank, means to move said support parallel to itself along a curve corresponding to the desired curve of the thread to cause the cutter to operate on the bore of the nut-blank, means to adjust the cutter radially in relation to the bore of the nut-blank, said last-mentioned means being adapted to vary said radial adjustment of the cutter.

11. A machine for cutting curved threaded nuts, comprising a chuck mounted to rotate a holder for the cutter mounted in the chuck, a cutter secured to the holder, a screw shaft in the chuck arranged to turn, a nut portion on the holder engaged by the screw to reciprocate the holder, a gear on the screw, a pair of gears mounted in the chuck engaging said gears on opposite sides to turn the screw, a shaft for each said two latter gears, a ratchet wheel on each said shaft, an arm projecting from the chuck that turns on each said two shafts, a pawl on each said arm arranged to engage said ratchet wheels respectively, a toothed disc for each said pawl arranged to engage the pawl intermittently by the teeth to cause the pawl to engage the ratchet wheel and turn the said gears and screw and shift the holder and cutter, means for rotating the chuck, means for turning the tooth discs and cause them to alternately engage a pawl and swing the holder in opposite directions the several teeth on each disc being arranged to progressively increase the swinging of the pawl and resulting movement of the screw, and a support for a nut-blank that is shifted from the driving means for the chuck to advance the nut-blank to cause its bore to be engaged by the cutter.

12. Machine as set forth in claim 11 in which the nut-blank is given an advance movement in which its axis varies in relation to the plane of movement of the cutter point.

In testimony whereof I have signed my name to this specification.

ELIS HELIN.